United States Patent [19]
Charle et al.

[11] 3,762,863
[45] Oct. 2, 1973

[54] WOOL OR HAIR TREATED WITH METHACRYLIC ANHYDRIDE OR ITACONIC ANHYDRIDE COPOLYMERIZED WITH MALEIC ANHYDRIDE AND AFTER TREATED WITH MERCAPTOETHYLAMINE AND PROPYLENE DIAMINE OR BUTYL AMINE

[75] Inventors: Roger Charle, Soisy sur Montmorency; Gregoire Kalopissis; Andrio Viout, both of Paris; Constantin Aretos, Issy-les-moulineaux; Jean Gascon, Paris, all of France

[73] Assignee: Societe anonyme dite: L'Oreal, Paris, France

[22] Filed: Jan. 13, 1972

[21] Appl. No.: 217,650

Related U.S. Application Data

[63] Continuation of Ser. No. 831,711, June 9, 1969, abandoned.

[52] U.S. Cl. .............................. 8/127.51, 8/127.6
[51] Int. Cl. ........................ A61k 7/10, D06m 3/06
[58] Field of Search ...................... 8/31, 100, 127.6, 8/128.5, 17; 260/78 UA

[56] References Cited
UNITED STATES PATENTS
3,576,592  4/1971  Zviak ................................ 8/128 A Primary Examiner—Donald Levy
Attorney—Cushman, Darby & Cushman

[57] ABSTRACT

Human hair and wool are treated with a water or aqueous alcoholic solution of a polysulfhydryl copolymer having a molecular weight of 1,000 – 20,000.

2 Claims, No Drawings

WOOL OR HAIR TREATED WITH METHACRYLIC ANHYDRIDE OR ITACONIC ANHYDRIDE COPOLYMERIZED WITH MALEIC ANHYDRIDE AND AFTER TREATED WITH MERCAPTOETHYLAMINE AND PROPYLENE DIAMINE OR BUTYL AMINE

This is a continuation, of application Ser. No. 831,711, filed June 9, 1969, and now abandoned.

SUMMARY OF THE INVENTION

It has already been suggested that keratinic fibers, and particularly human hair be treated with sulfhydrylated polymers which are derived from the condensation of aminothiols with certain types of polymers having acid anhydride groups in their chains, which are capable of reacting with the amino group of the aminothiol to produce an amide bond.

Among the polymers which will react with an aminothiol which have already been suggested are: the copolymers resulting from the copolymerization of maleic anhydride with various types of ethylene monomers such as olefines, and vinyl, acrylic, and methacrylic derivatives, and homopolymers resulting from the polymerization of an unsaturated acid anhydride.

The present invention relates to new polysulfhydryl polymers which may be advantageously used to treat keratinic textile fibers in order to improve their own properties and also to facilitate their dyeing, and particularly with reactive dyes.

It is an object of the present invention to provide as a new article of manufacture a polysulfhydryl copolymer characterized by the fact that it comprises:

Constituents I having the following formula:

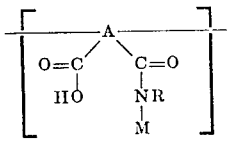

in which:

A represents a component selected from the group consisting of:

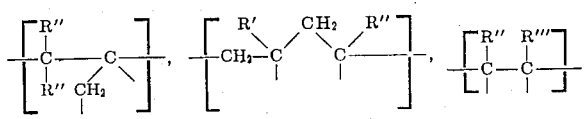

in which R, R' and R'' represent either hydrogen or a lower alkyl radical and R''', represents a lower alkyl radical;

and constituents II responding to the formula:

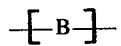

in which
B represents a constituent other than constituent I selected from the group consisting of:
the foregoing constituents,
the constituent:

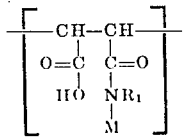

the constituent:

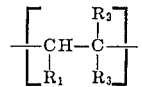

in which $R_1$ and $R_2$ represent either a hydrogen atom or a lower alkyl radical, $R_3$ represents either a hydrogen atom, a lower alkyl radical, $-OCOCH_3$, $-COOCH_3$, $-CN$, or an alkoxy radical, M may be identical or different for each constituent and is selected from the group consisting of:
a remainder having a thiol function,
a hydrocarbon remainder which may have an amine function, it being understood that for at least 1 percent of the constituents M signifies a remainder representing a thiol function.

In the above definitions and throughout the specification lower alkyl is an alkyl having 1-6 carbon atoms, such as $-CH_3$, $-C_6H_{13}$, etc. and alkoxy is an alkoxy having 1-6 carbon atoms such as $-OCH_3$, $-OC_6H_{13}$, etc.

The polymers according to the invention must be soluble in water and lower molecular weight volatile alcohols such as ethanol and propanol. They have molecular weight generally comprised between 1.000 and 20.000.

In a particular embodiment, the copolymer may also contain one or more types of constituents different from constituents I and II and selected from the group consisting of the possible constituents of group II.

In a preferred embodiment of the invention, the constituents I are derived from the polymerization of an unsaturated organic anhydride selected from the group consisting of itaconic anhydride, citraconic anhydride, acrylic anhydride, methacrylic anhydride, a mixed acrylic/methacrylic anhydride, which is condensed by amidification with an amino-thiol, a monoamine, or a diamine.

In a preferred embodiment of the invention, the constituents II are derived from the polymerization of an unsaturated ethylene monomer selected from the group consisting of maleic anhydride, itaconic anhydride, citraconic anhydride, acrylic anhydride, methacrylic anhydride, mixed acrylic-methacrylic anhydride, olefines having from 2 to 8 carbon atoms, acrylic, methacrylic and vinyl derivatives, such as esters, amides, nitriles of acrylic or methacrylic acid, and esters or ethers of vinylic alcohol.

Among the amino-thiols which may be amide bonded to form the remainder M are:
those aminothiols having the formula:

$$HS - R - NH - R'$$

in which

R represents an alkylene radical preferably comprising 2 to 4 carbon atoms, which may be substituted either by lower alkyls which may have up to 4 carbon atoms, or by a carboxyl radical or by a carbalkoxy group which radical or group may have 1–5 carbon atoms, and R' represents a hydrogen atom or a lower alkyl such as $-CH_3$ or $-C_2H_5$.

Among the aminothiols corresponding to the foregoing formula are:

β-mercaptoethylamine,
cysteine, and
ethyl cysteinate

Among the amino-thiols which may be amide bonded to form the remainder M are the mercapto-amide amines having the formula:

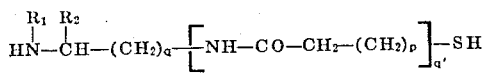

in which:

$R_1$ represents H, $-CH_3$, $-C_2H_5$, or $-CH_2-CH_2-OH$, $R_2$ represents H or COOH, $q$ is a whole number between 1 and 5 inclusive, $q'$ equals 0 or 1, $p$ equals 0 or 1.

Among the mercapto-amide amines corresponding to this last formula are those derived from thioglycolic acid esters, thiolactic acid esters, β-mercaptopropionic acid esters, and from diamines such as ethylene diamine, hexamethylene diamine, and N-hydroxyethyl ethylene diamine.

In accordance with the invention, the remainder M may also be derived from amines having no $-SH$ groups. This makes it possible to reduce at will the concentration of -SH groups in the polysulfhydryl homopolymers, while at the same time introducing into the polymer groups which impart particular properties thereto.

Thus for certain constituents M may be derived by amide bonding of compounds responding to the formula:

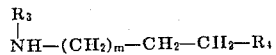

in which :

$R_3$ represents hydrogen or a lower alkyl, $R_4$ represents a lower alkyl or a radical having the formula

, in which r and r' are identical or different lower alkyls, or may form part of a heterocyclic ring such as that of morpholine or piperidine.

$m$ is a whole number between 0 and 4 inclusive.

Among the compounds responding to the above formula are butylamine, N,N-diethylpropylene diamine and N-(β-aminoethyl) morpholine, but this list is merely representative and not exhaustive.

All M groups can be thiols groups.

Nevertheless when partially polysulfhydryl copolymers are produced according to the invention, the proportions of mercapto-amine in a given homopolymer may be varied within broad limits ranging for example from 1 to 99 percent, but preferably 20 to 80 percent of the totality of the remainder M the copolymer according to the invention must contain at least 1 percent of SH function as regard as the total amount of anhydride functions fixed on the copolymer.

It is a further object of the present invention to provide a method of preparing a polysulfhydryl copolymer such as described above, which method is characterized by the fact that two different unsaturated monomers belonging to the above groups are first copolymerized, after which the aminothiols and amines corresponding to the desired formula are condensed on the resulting copolymer.

Another embodiment of the process according to the invention may also include the copolymerization of unsaturated diacid monomers derived from the above-defined anhydride monomers, the diacid functions being transformed into acid anhydride functions, to which at least one aminothiol such as above described is amide bonded.

In yet another embodiment of the process according to the invention an aminothiol or amine is attached to an unsaturated anhydride monomer of the type above described and the resulting monomers are then copolymerized.

It is a further object of the present invention to provide as a new article of manufacture a composition for treating the hair, wool and other keratinic fibers which is essentially charactrized by the fact that it contains at least one polysulfhydryl copolymer of the type described above.

In a preferred embodiment of the invention the composition contains from 1 to 10 percent and preferably 2 to 5 percent by weight of the polysulfhydryl copolymer.

The $pH$ value of the compositions according to the invention may advantageously fall between 7 and 9 inclusive.

The cosmetic composition may also contain any type of cosmetic ingredient, such as swelling agents, surface-active agents, perfumes and resins.

This cosmetic composition according to the invention may take the form of an aqueous or hydro-alcoholic lotion and serve as a hair setting lotion. It may also take the form of a cream or gel or be packaged as an aerosol in a liquefied hydrocarbon mixture.

The present invention also relates to a new method of treating keratinic textile fibers, particularly in order to facilitate their dyeing with reactive or metalliferous dyes. This process is essentially characterized by the fact that the keratinic textile fibers are impregnated with a polysulfhydryl copolymer as hereinbefore defined.

It is a further object of the present invention to provide a new method of dyeing keratinic fibers characterized by the fact that the fibers are impregnated with a solution of at least one copolymer as hereinbefore defined, after which the fibers are dyed with at least one dye selected from the group consisting of reactive and metalliferous dyes.

It is a further object of the present invention to provide the new article of manufacture which consists of keratinic fibers characterized by the fact that they have been impregnated with a polysulfhydryl copolymer as above described.

Yet another object of the invention is to provide as a new article of manufacture keratinic fibers characterized by the fact that they have been dyed by reactive or metalliferous dyes after having been impregnated by a copolymer such as has been defined above.

In order that the invention may be better understood, several methods of preparing copolymers according to the invention will now be described, purely by way of illustration and example.

EXAMPLE 1

Preparation of a 50 percent maleic anhydride-50 percent itaconic anhydride copolymer (in terms of weight).

The following starting materials are placed in a one-liter flask equipped with a stirring rod, a reflux condenser, a thermometer, a dropping funnel and a tube for introducing nitrogen:

| | |
|---|---|
| maleic anhydride | 60 g |
| itaconic anhydride | 60 g |
| distilled benzene | 300 cc |

This is heated to reflux and a solution containing 24 g of benzoyl peroxide in 200 cc of benzene is introduced drop by drop over a 24 hour period.

The resulting copolymer precipitates. It is dried, washed in pentane, and dried.

The result is a white copolymer in powder form, with an overall yield for the reaction of 85 percent. The analyses reveal an anhydride index of 991.4, while the theoretical anhydride index of 1,072.

EXAMPLE 2

Preparation of a 75 percent maleic anhydride-25 percent methacrylic anhydride copolymer (in terms of weight).

The following starting materials are placed in a one-liter flask equipped with a stirring rod, a reflux condenser, a thermometer, a dropping funnel, and a tube for introducing nitrogen:

| | |
|---|---|
| maleic anhydride | 75 g |
| distilled benzene | 240 cc |
| benzoyl peroxide | 5.882 g |

This is heated to reflux and 25 g of methacrylic anhydride is introduced drop by drop over a period of 12 hours.

The resulting polymer is filtered, washed with pentane, and dried.

The yield of the reaction, by weight, is 60 percent.

Analysis shows that the anhydride index is 1,046. The theoretical anhydride index is also 1,046.

EXAMPLE 3

Preparation of a polysulfhydryl copolymer having the formula:

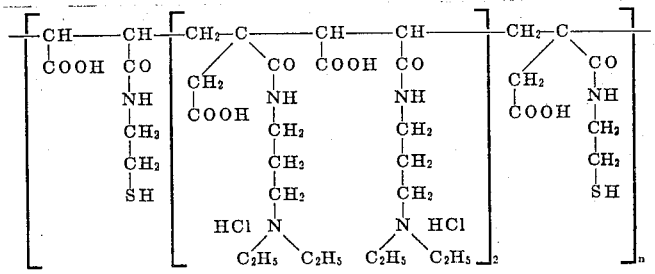

β-mercaptoethylamine and N,N-diethyl propylene diamine are condensed on the maleic anhydride/itaconic anhydride copolymer prepared in Example 1.

37.8 g (1/3 gram mole) of β-mercaptoethylamine hydrochlorid and 250 ml of water, followed by 86.6 g (2/3 gram mole) of N,N-diethyl-propylene diamine are introduced into a flask equipped with a stirring rod, a thermometer, a dropping funnel, and a tube for introducing nitrogen.

13.3 g (1/3 gram mole) of sodium hydroxide in tablet form are than added while cooling so as to liberate the amine from its hydrochloride. 56 g (0.5 gram mole) of the copolymer prepared in Example 1, followed by 20 g (0.5 gram mole) of sodium hydroxide tablets, are then added, while stirring and cooling, to liberate the amine contaminating the carboxyl of the polymer.

56 g (0.5 gram mole) of the polymer and 20 g (0.5 gram mole) of sodium hydroxide tablets are then added simultaneously.

When the reaction has been completed, the reaction medium is acidified by adding concentrated hydrochloric acid, which precipitates the polymer. The product precipitated is washed in water and then vacuum dried. The result is a yield of 50% by weight of the desired end product. The following tests were carried out on this polymer which, after drying, is a powder which is soluble in water at alkaline pH values.

| | Calculated % | % Found | Corrected % Found |
|---|---|---|---|
| Cl total | 9.46 | 7.19 | 2.94 |
| NaCl | 0 | 7.00 | |
| Free SH | 4.40 | 1.48–1.50 | 1.59–1.61 |
| Total SH | | 2.07–2.07 | 2.21–2.23 |

By "Total SH" is meant the total of all the free SH groups in the product plus those SH groups which the oxidized part of the product (S-S) may form after complete reduction during analysis.

By "Cl total" is meant the sum of the Cl⁻ groups from the hydrochloride of the tertiary amine and the Cl⁻ groups from the NaCl.

EXAMPLE 4

A polysulfhydryl polymer according to the invention and having the following formula is prepared:

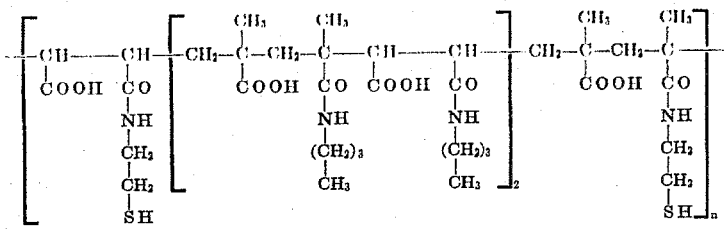

by condensing β-mercaptoethylamine and butylamine on a maleic anhydride/methacrylic anhydride copolymer prepared as described in Example 2.

The procedure is the same as in Example 3, except that the N,N-diethylpropylene diamine is replaced by an equimolecular quantity of butylamine. The yield is 60 percent by weight of a powder which is soluble in water at an alkaline pH, and on which the following analytical tests were carried out:

|  | Calculated % | % Found | % found after correction due to NaCl |
|---|---|---|---|
| Free SH | 6.07 | 1.20–1.40 | 1.34 |
| Total SH |  | 2.60–2.90 | 2.84 |
| NaCl |  | 3.21 |  |

EXAMPLE 5

Preparation of 50 percent vinyl acetate - 50 percent citraconic anhydride copolymer The following products are introduced into a one-liter flask equipped with a stirring rod, a reflux condenser, a thermometer, and a tube for introducing nitrogen:

| vinyl acetate | 50 g |
| citraconic anhydride | 50 g |
| toluene distilled | 233 cc |
| benzoyl peroxide | 5.882 g |

This is heated to reflux while stirring under a nitrogen atmosphere. The resulting copolymer precipitates in the toluene. The operation comes to an end after 8 hours. The product is washed with petroleum ether and dried.

The copolymer is in the form of a powder.

The yield of the reaction is 86 by weight.

The anhydride index of the resulting product is 563.5, against a theoretical index of 500. The end product comprises 43.7 percent vinyl acetate and 56.3 percent citraconic anhydride by weight.

EXAMPLE 6

Preparation 50 percent isobutylvinyl ether, 50 percent itaconic anhydride copolymer The following starting materials are introduced into a one liter flask equipped with a stirring rod, a reflux condenser, a thermometer, and a tube for introducing nitrogen:

| isobutylvinyl ether | 50 g |
| itaconic anhydride | 50 g |
| distilled toluene | 233 cc |
| benzoyl peroxide | 5.882 g |

This is heated to reflux while stirring under a nitrogen atmosphere.

After 8 hours, a reddish viscous solution is obtained. The resulting polymer is precipitated with petroleum ether, and dried. This polymer is in the form of a red powder. The yield of the reaction is 80 by weight. The anhydride index of the reaction product is 572 against a theoretical index of 500. The polymer comprises 42.8 percent by weight of isobutylvinyl ether groups and 57.2% by weight of itaconic anhydride.

EXAMPLE 7

Preparation of 75 percent methyl acrylate - 25 percent acrylic anhydride copolymer The following starting materials are introduced into a one-liter flask equipped with a stirring rod, a reflux condenser, a thermometer, and a tube for introducing nitrogen.

| methyl acrylate | 75 g |
| acrylic anhydride | 25 g |
| toluene | 300 cc |
| benzoyl peroxide | 5.882 g |

This is heated slowly to reflux while stirring under a nitrogen atmosphere. After 8 hours, the yield is a powder which is drained, washed with pentane, and dried. The copolymer is in the form of a white powder. The yield of the reaction is 70 percent by weight. The anhydride index of the resulting product is 374, against a theoretical index of 222. The polymer comprises 58 percent by weight of methyl acrylate groups and 42 percent by weight of acrylic anhydride groups.

EXAMPLE 8

Condensation of β-mercapto-ethylamine and N,N-diethyl propylene diamine on a vinyl acetate/citraconic anhydride copolymer prepared as in Example 5

The following copolymer is prepared:

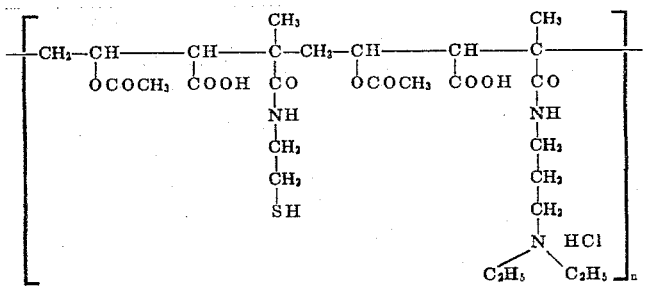

The procedure is as follows:

56.8 g (1/2 gram mole) of β-mercapto ethylamine hydrochloride, 65 g (one-half gram mole) of N,N-diethylpropylene diamine and 600 cm³ of water are introduced into a flask equipped with a stirring rod, a thermometer, a tube for introducing nitrogen and a dropping funnel. 20 g (one-half gram mole) of sodium hydroxide are then added to liberate the amine. 99 g (0.5 gram mole) of vinyl acetate/citraconic anhydride copolymer is then added while stirring and cooling.

After having introduced the polymer into the flask, 20 g (0.5 gram mole) of sodium hydroxide tablets are added to the reaction mixture, little by little. The 99 g (0.5 gram mole) more of the vinyl acetate/citraconic anhydride copolymer is added, followed by 20 g more of sodium hydroxide tablets, added little by little.

At the end of 3 to 4 hours, the reaction ends and the end product is isolated by acidification and precipitation out with sodium chloride.

The result is 184 g of the desired copolymer in the form of a powder which is soluble in water at a neutral or alkaline pH value. This corresponds to a yield of about 60 percent.

The final polymer contains 10 percent sodium chloride.

This resulting product is purified by dissolving it in a mixture of dimethylformamide and alcohol, the insoluble sodium chloride being eliminated by filtration. The desired product is precipitated from the filtrate by adding ether.

The following analyses of the end product were made:

|  | Calculated % | % Found | % found as corrected on account of NaCl |
|---|---|---|---|
| Cl total | 5.54 | 9.06–9.12 | 3.35 |
| NaCl | 0 | 10 |  |
| Free SH | 5.15 | 2.53–2.55 | 2.8 |
| Total SH |  | 5.4–5.16 | 5.86 |

EXAMPLE 9

Condensation of β-mercapto-ethylamine and butylamine on an isobutylvinyl ether/itaconic anhydride copolymer prepared as in Example 6 to produce a polysulfhydryl copolymer having the formula:

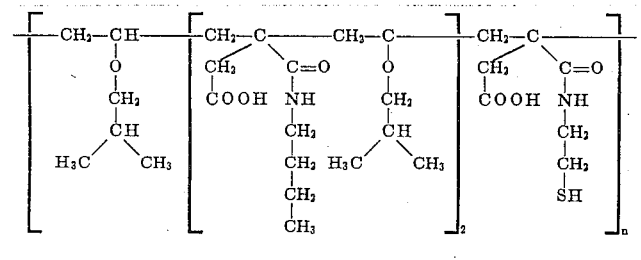

The procedure is the same in Example 8 except that one-third gram mole of β-mercaptoethylamine and two-thirds gram mole of butylamine is condensed on 1 gram mole of isobutylvinyl ether/itaconic anhydride copolymer.

The result is a yield of 80–85 percent by weight of a gum which, after purification with dimethylformamide, precipitation with ether, and drying, takes the form of a powder which is soluble in water at a neutral or alkaline pH.

The end product was analyzed, with the following results:

|  | Calculated % | % found | Corrected % |
|---|---|---|---|
| NaCl | 0 | 4.9–4.6 |  |
| Free SH | 4.05 | 0.37–0.38 | 0.39–0.40 |
| Total SH |  | 1.16–1.18 | 1.22–1.24 |

EXAMPLE 10

Condensation of β-mercaptoethylamine on a methyl acrylate/acrylic anhydride copolymer prepared as in Example 7 to produce a polysulfhydryl copolymer having the formula:

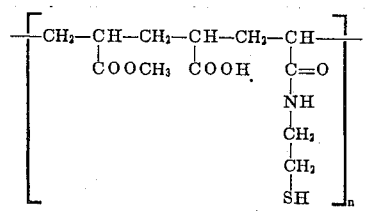

The procedure is the same as in Example 8, except that 1 gram mole of β-mercaptoethylamine is condensed on 1 gram mole of methyl acrylate/acrylic anhydride copolymer. The yield is 83 percent by weight of a gum which, after purification, takes the form of a pulverulent mass which is soluble in water at a neutral of alkaline pH.

Analysis of this product showed the following results:

|  | Calculated % | % Found |
|---|---|---|
| NaCl | 0 | 0 |
| Free SH | 8.25 | 0.27–0.27 |
| Total SH |  | 5.80–5.65 |

Examples of Application

Example A

A hair setting lotion according to the invention having the following composition is prepared:

| | |
|---|---|
| Copolymer obtained as in Example 4 | 3 g |
| aminoethylpropanediol | q.s.p. pH = 7 |
| ethyl alcohol | q.s.p. 25° |
| perfume | 0.2 g |
| water | q.s.p. 100 cc |

The resin is first dissolved in the water in the presence of aminoethylpropanediol. The ethyl alcohol and perfume are then added. The pH value is adjusted with the above base and the lotion completed by adding enough water to make up the indicated volume.

In order to set the hair, 20 cm³ of this lotion is applied to hair which has been washed and dried. The hair is then combed to spread the lotion, wound up on rollers, and dried. After unwinding, the hair is combed, and a set of excellent quality results.

Example B

A solution having the following composition is prepared as in Example A:

| | |
|---|---|
| copolymer produced as in Example 9 | 3.5 g |
| aminoethylpropanol | q.s.p. pH = 7 |
| ethyl alcohol | q.s.p. 50° |
| water | q.s.p. 100 cc |

65 g of the above solution is packaged in an aerosol bomb containing 4 g of butane as a propellant.

This lotion is applied to hair in the same way as in the previous example, while the aerosol spray permits the lotion to be more easily spread over the hair. After drying the hair on the rollers, the result is a set of excellent quality.

Example C

In order to set the hair a lotion having the following solution is prepared and applied in the same manner as in Example A.

| | |
|---|---|
| copolymer produced as described in Example 8 | 3 g |
| aminothylpropanol | q.s.p. pH=8 |
| ethyl alcohol | q.s.p. 20° |
| water | q.s.p. 100 cc |

Equally good results are obtained with respect to the holding power of the hair set.

The following solutions may be used to impregnate keratinic fibers as set forth in the following examples.

Solution I

| | |
|---|---|
| polysulfhydryl copolymer produced as described in Example 3 | 3 g |
| solution of ammonia at 22° Be | 4.5 cc |
| water | q.s.p. 100cc |

Solution II

| | |
|---|---|
| polysulfhydryl copolymer produced as described in Example 10 | 1.1 g |
| solution of ammonia at 22° Be | 2 cc |
| water | q.s.p. 100cc |

Example D 4 g of woolen yarn is treated with solution I by immersing it therein at room temperature for 15 minutes. After drying, the yarn is rinced in an N/10 solution of acetic acid and dyed by immersing it in a dyeing solution containing:

| | |
|---|---|
| Reactive Blue 2 C.I | 0.12 g |
| glacial acetic acid | 2 cc. |
| water | q.s.p. 200 cc |

The dyeing is carried out at 80° C for 60 minutes. It is then copiously rinsed, scoured at 50° C for 20 minutes in a 2 percent solution of ammonia. It is again rinsed and then boiled as wool is conventionally boiled when being dyed.

The result is a blue coloration.

Example E 4 g of woolen yarn is immersed in solution II for 15 minutes at room temperature. After drying it is rinsed with N/10 solution of acetic acid, and dyed by immersing it in a dyeing solution containing:

| | |
|---|---|
| Reactive red 7 G.1 | 0.12 g |
| glacial acetic acid | 2 cc |
| water | q.s.p. 200 cc |

The dyeing is carried out at 80° C for 60 minutes. The wool is rinsed copiously in water and scoured at 50° C for 20 minutes in a 2 solution of ammonia. It is again rinsed and boiled in the manner conventional in the case of wool.

An attractive red coloration results.

Similar dyeing results are obtained on other types of keratinic fiber such as human hair, fur and animal hairs other than wool, etc., and improved keratinic fiber dyeing occurs using other keratinic fiber dyes such as reactive dyes, or metalliferous dyes, and dyes such as Acid Green 12 Cl 13425, and Black 43 Cl 15,691, etc., and the various reactive dyes set forth in copending application Ser. No. 441,311, filed Mar. 19, 1965.

All of the polymers that have the constituents I and II are soluble in water and/or volatile alcohols, such as ethanol, propanol, etc., and they all may be used to treat human hair and other keratinic fibers and to improve the dyeability of keratinic fibers such as wool with reactive dyes or other types of dyes.

Our tests show that the substituted groups A, R, R', R'', R''', B, $R_1$, $R_2$, $R_3$, M, etc., defined above, do not prevent the critical solubilizing action of the COOH groups and the reducing action of the SH groups on the polymer.

What is claimed is:

1. A process for treating human hair comprising applying to said hair effective amounts of a composition comprising a solution in a solvent selected from the group consisting of water and an aqueous alcoholic solution of 1–10 percent by weight of a polysulfhydryl copolymer having a molecular weight between 1,000 – 20,000, said polysulfhydryl copolymer being selected from the group consisting of a. polysulfhydryl polymer having recurring units of the formula

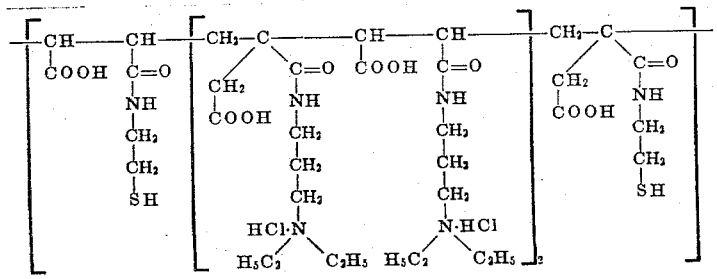

and b. polysulfhydryl polymer having recurring units of the formula

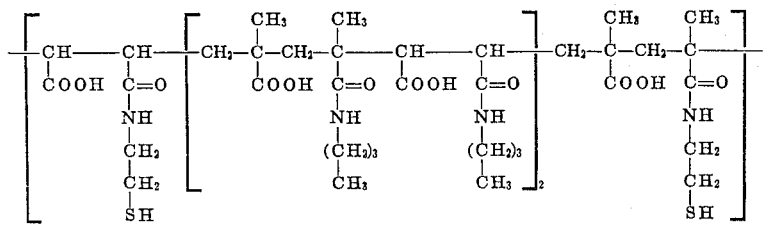

said composition having a pH of 7–9, winding said hair on rollers and drying said hair.

2. A process for treating wool comprising immersing said wool in a composition comprising a solution in a solvent selected from the group consisting of water and an aqueous alcoholic solution of 1–10 percent by weight of a polysulfhydryl copolymer having a molecular weight between 1,000 – 20,000 said polysulfhydryl copolymer being selected from the group consisting of a. polysulfhydryl polymer having recurring units of the formula

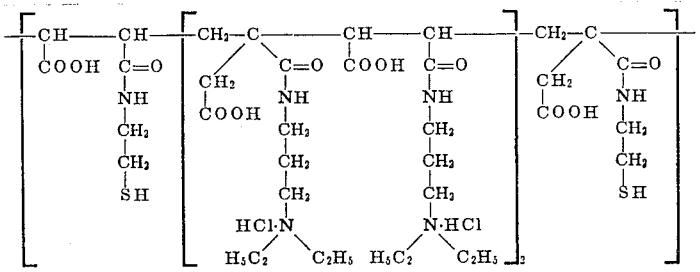

and b. polysulfhydryl polymer having recurring units of the formula

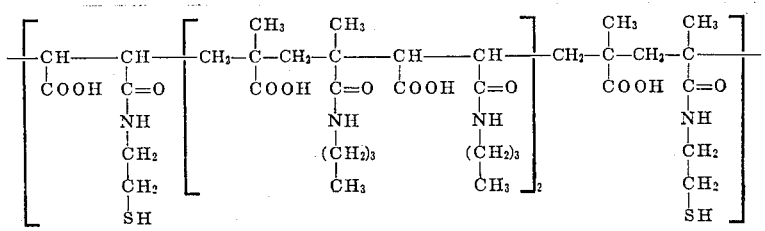

said composition having a pH of 7-9, drying said wool and rinsing said wool with N/10 solution of acetic acid.

* * * * *

UNITED STATES PATENT OFFICE
CERTIFICATE OF CORRECTION

Patent No. 3,762,863          Dated October 2, 1973

Inventor(s) Roger Charle, Gregoire Kalopissis, Andre Viout, Constantin Aretos and Jean Gascon It is certified that error appears in the above-identified patent and that said Letters Patent are hereby corrected as shown below:

In the Heading, "Andrio Viout" should read --Andre Viout--.

Please insert --Claims priority, application France, June 10, 1968, No. 154,407--.

Column 9, the structural formula between lines 48-60 should read:

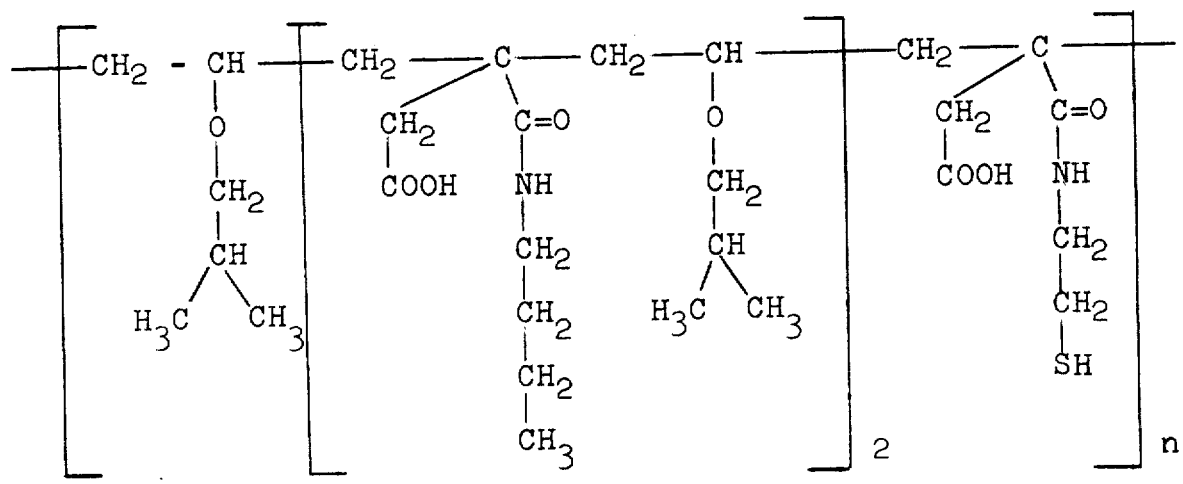

Signed and sealed this 2nd day of April 1974.

(SEAL)
Attest:

EDWARD M. FLETCHER, JR.
Attesting Officer

C. MARSHALL DANN
Commissioner of Patents